Figure 1:
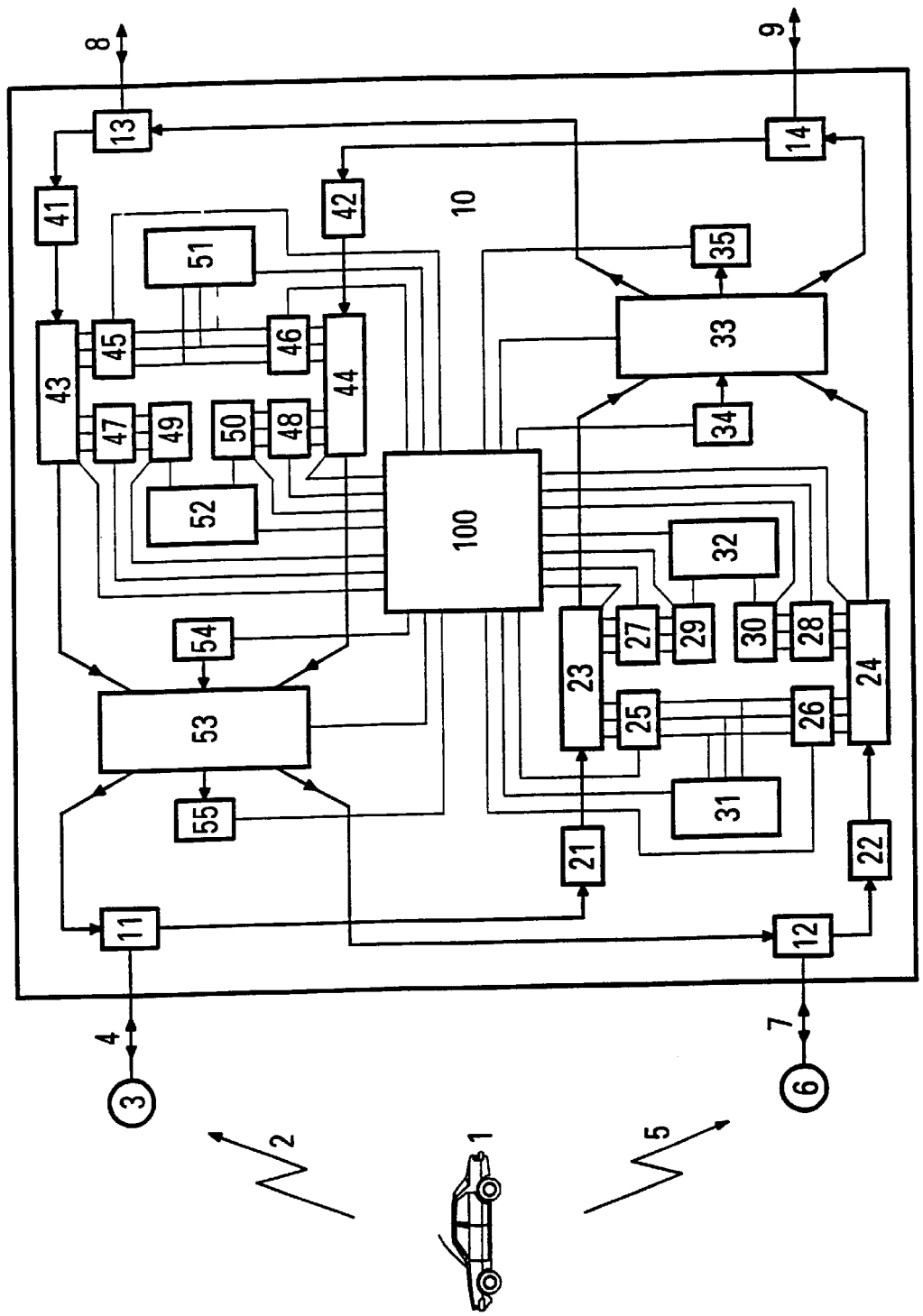

United States Patent [19]
Norp

[11] Patent Number: 5,974,035
[45] Date of Patent: *Oct. 26, 1999

[54] TELECOMMUNICATION SYSTEM, AND DATA-PACKETS SWITCH, AND METHOD

[75] Inventor: Antonius Hendrikus Johannes Norp, The Hague, Netherlands

[73] Assignee: Koninklijke PTT Nederland N.V., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/769,413

[22] Filed: Dec. 19, 1996

[30] Foreign Application Priority Data

Jan. 5, 1996 [NL] Netherlands ............... 1002030

[51] Int. Cl.$^6$ .................................................. H04L 12/56
[52] U.S. Cl. .................... 370/331; 370/401; 370/465; 370/471
[58] Field of Search .................... 370/331, 338, 370/400, 401, 395, 465, 466, 471; 455/442

[56] References Cited

U.S. PATENT DOCUMENTS

| | | | |
|---|---|---|---|
| 5,381,409 | 1/1995 | de Vries . | |
| 5,408,514 | 4/1995 | Sakamoto et al. | 370/338 |
| 5,487,065 | 1/1996 | Acampora et al. | 370/331 |
| 5,621,786 | 4/1997 | Fischer et al. | 370/331 |
| 5,691,985 | 11/1997 | Lorenz et al. | 370/401 |
| 5,722,074 | 2/1998 | Muszynski | 455/442 |

FOREIGN PATENT DOCUMENTS

| | | |
|---|---|---|
| 0 450 708 | 4/1995 | European Pat. Off. . |
| WO 92/22034 | 12/1992 | WIPO . |

OTHER PUBLICATIONS

A.S. Acampora et al, "An Architecture and Methodology for Mobile–Executed Handoff in Cellular ATM Networks", IEEE Journal on Selected Areas in Communications, vol. 12, No. 8, Oct. 1994, pp. 1365–1375.

L. Van Hauwermeiren et al., "Requirements for Mobility Support in ATM", Conference Record of IEEE Globecom, Communications: The Global Bridge, San Francisco, California, Nov. 28 –Dec. 2, 1994, pp. 1691–1695.

M.J. McTiffin et al., "Mobile Access to an ATM Network Using a CDMA Air Interface", IEEE Journal on Selected Areas in Communications, vol. 12, No. 5, Jun. 1994, pp. 900–908.

D. Raychaudhuri et al., "ATM–Based Transport Architecture for Multiservices Wireless Personal Communication Networks", IEEE Journal on Selected Areas in Communications, vol. 12, No. 8, Oct. 1994, pp. 1401–1414.

*Primary Examiner*—Chi H. Pham
*Assistant Examiner*—Frank Duong
*Attorney, Agent, or Firm*—Michaelson & Wallace; Peter L. Michaelson

[57] ABSTRACT

In a telecommunication system, a mobile terminal is connected, before initiation of a handover procedure, to a first base station, and first data packets flow from the first base station by way of a first link to a data-packets switch which, in response thereto, transmits third data packets by way of a third link. After termination of the handover procedure, the mobile terminal is connected to a second base station, and second data packets flow from the second base station by way of a second link to the data-packets switch which, in response thereto, transmits third data packets by way of the third link. By, during the handover procedure, coupling both the first link and the second link to the third link by way of the data-packets switch, during the handover procedure data packets are switched in an advantageous manner, which requires no great accuracy and no additional analyzing/converting device.

14 Claims, 1 Drawing Sheet

TELECOMMUNICATION SYSTEM, AND DATA-PACKETS SWITCH, AND METHOD

A. BACKGROUND OF THE INVENTION

The invention relates to a telecommunication system comprising at least a first and a second base station for wireless communication with a mobile terminal which before initiation of a handover procedure is wirelessly connected to the first base station and which after termination of the handover procedure is wirelessly connected to the second base station, which first base station is capable of being coupled to a data-packets switch by way of a first link and which second base station is capable of being coupled to the data-packets switch by way of a second link, with first data packets arriving by way of a first link comprising a first header part and a first data part, and second data packets arriving by way of the second link comprising a second header part and a second data part, and third data packets to be transmitted by way of a third link comprising a third header part and a third data part.

Such a telecommunication system is generally known. When, as a result of a displacement during communication, the mobile terminal comes into an overlapping part of the first coverage area of the first base station and the second coverage area of the second base station, the handover procedure is started. Before initiation of the handover procedure, there flow first data packets, by way of the first link, from the first base station to the data-packets switch which, in response thereto, transmits third data packets by way of the third link. After termination of the handover procedure, there flow second data packets, by way of the second link, from the second base station to the data-packets switch which, in response thereto, transmits third data packets by way of the third link. Since in each base station there is a buffer which buffers data packets, data packets could be lost during the handover procedure, particularly around the time of deactivation of the first wireless connection between the mobile terminal and the first base station, and of activation of the second wireless connection between the mobile terminal and the second base station. In order to prevent data packets getting lost, two possible solutions have been invented.

According to a first solution, there is applied an analyzing/converting device (a so-called UMTS Mobility Server or UMS) [UMTS=Universal Mobile Telecommunications System] in parallel to the data-packets switch. During the handover procedure, the analyzing/converting device by way of the data-packets switch receives all data packets from both base stations, analyzes the information present in these data packets, and combines and converts the data packets, whereafter a flow of third data packets obtained in this manner is transmitted by way of the data-packets switch. Apart from the need of placing an additional analyzing/converting device and the time consumed by analyzing, combining and converting, the analyzing/converting device has the drawback either that during the handover procedure three additional connections of the data-packets switch should be put into operation, which drastically reduces the effectiveness of the data-packets switch, or that the analyzing/converting device, not only during the handover procedure but during the complete communication, should be applied to a location situated between the base stations and the data-packets switch.

According to a second solution, the data-packets switch should break the coupling between the first link and the third link at the point in time on which the first buffer in the first base station is completely empty, and the data-packets switch should realize the coupling between the second link and the third link at exactly the same point in time, while up to this point in time the second buffer in the second base station is only allowed to buffer and not to let through, and exactly from this point in time onwards should generate stored data packets for transmission by way of the second link. The second solution (the so-called synchronized switching) has the drawback that in different locations simultaneous actions should be carried out with very great accuracy, which entails a great susceptibility to interference.

B. SUMMARY OF THE INVENTION

The object of the invention is, inter alia, to provide a telecommunication system of the type referred to in the preamble, which requires neither the placing of an analyzing/converting device nor the carrying out of simultaneous actions at different locations with very great accuracy.

The telecommunication system according to the invention is characterized in that the data-packets switch is provided with converting means for, during at least part of the handover procedure, converting both the first header part and the second header part into the third header part, with the third data part comprising at least part of at least one of the first and second data parts.

By applying the converting means, both the first link and the second link are coupled to the third link during at least part of the handover procedure, as a result of which it is no longer required to switch with great accuracy, and the additional analyzing/converting device is no longer necessary. Converting both the first header part and the second header part into the third header part may be realized in a simple manner by in the data-packets switch providing a first table associated with the first link, of which first table a left column comprises first header parts, and a second table associated with the second link, of which second table a left column comprises second header parts, with the same right column, which then should comprise third header parts. In this connection, the third data part should generally comprise either the first or the second data part, although exceptions to this are possible.

The invention is based, inter alia, on the insight that, if both the first link and the second link are coupled to the third link during at least part of the handover procedure, both known solutions may be omitted, which is already advantageous per se, while then additionally the drawbacks associated with the known solutions are avoided.

In this manner, the problems associated with both known solutions are avoided by making the data-packets switch suitable, e.g., by means of software, for during a certain time interval interconnecting first data packets arriving by way of the first link, as well as second data packets arriving by way of the second link, in the direction of the third link, in order to be transmitted as third data packets by way of the third link after adjustment of at least the header part.

A first embodiment of the telecommunication system according to the invention is characterized in that the data-packets switch is provided with further converting means for, during at least part of the handover procedure, converting a fourth header part of fourth data packets arriving by way of a fourth link into both a fifth header part of fifth data packets to be transmitted by way of the first link and a sixth header part of sixth data packets to be transmitted by way of the second link.

By during at least part of the handover procedure applying the further converting means, the fourth link is coupled to both the first link and the second link, as a result of which data packets intended for the mobile terminal are fed both to the first base station and to the second base station, which renders the necessity of switching with great accuracy superfluous. In this connection, the fourth link will generally correspond to the third link. The conversion of the fourth header part of fourth data packets arriving by way of the fourth link into both the fifth header part of fifth data packets to be transmitted by way of the first link and the sixth header part of the sixth data packets to be transmitted by way of the second link may be realized in a simple manner, e.g., by way of a three-column table memory, a left column for the fourth header parts, a middle column for the fifth header parts and a right column for the sixth header parts. Here, the data part of the fourth data packet could then be copied for the purpose of completing the data parts of the fifth and the sixth data packets.

A second embodiment of the telecommunication system according to the invention is characterized in that the first header parts of the first data packets are each provided with an identification part comprising a first value, and the second header parts of the second data packets are each provided with an identification part comprising a second value, and the third header parts of the third data packets are each provided with an identification part comprising a third value.

According to the second embodiment, each headed part comprises its own identification part, such as, e.g., a vpi/vci (virtual-path identifier/virtual-circuit identifier).

A third embodiment of the telecommunication system according to the invention is characterized in that the converting means are provided with means for, during at least part of the handover procedure, converting both the first value and the second value into the third value, which first value and second value are mutually equal.

In this connection, an additional provision should be provided in at least one of the two base stations, in order that both base stations transmit the mutually equal first and second values to the data-packets switch, which simplifies the control of the data-packets switch as a result of no longer having to take into account two different first and second values, which should be converted into the same third value.

A fourth embodiment of the telecommunication system according to the invention is characterized in that the converting means are provided with further means for, during at least part of the handover procedure, converting both the first value and the second value into the third value, which first value and second value are mutually different.

In this connection, no additional provisions need be made in either of the base stations, since the control of the data-packets switch has been informed of the need to convert the mutually different first and second values into the third value.

The invention further relates to a data-packets switch for
by way of a first link receiving first data packets and, in response thereto, by way of a third link transmitting third data packets, which first data packets comprise a first header part and a first data part, and which third data packets comprise a third header part and a third data part, and
by way of a second link receiving second data packets and, in response thereto, by way of a fourth link transmitting fourth data packets, which second data packets comprise a second header part and a second data part, and which fourth data packets comprise a fourth header part and a fourth data part.

Such a data-packets switch is generally known. First, data packets are received by way of the first link, in response whereto third data packets are transmitted by way of the third link. Second data packets are received by way of the second link, in response whereto fourth data packets are transmitted by way of the fourth link. Such a data-packets switch, e.g., in the event of application as MSC, or Mobile Switching Center, in telecommunication systems during so-called handover procedures, requires either the placing of an analyzing/converting device or the carrying out of simultaneous actions at different locations with very great accuracy.

A further object of the invention is, inter alia, to provide a data-packets switch of the type referred to above which requires neither the placing of an analyzing/converting device nor the carrying out of simultaneous actions at different locations with very great accuracy.

The data-packets switch according to the invention is characterized in that the data-packets switch is provided with converting means for, during at least a time interval, converting both the first header part and the second header part into the third header part, with the third data part comprising at least part of at least one of the first and second data parts.

By applying the converting means, both the first link and the second link are coupled to the third link during at least the time interval, as a result of which it is no longer required to switch with great accuracy, and the additional analyzing/converting device is no longer necessary. Converting both the first header part and the second header part into the third header part may be realized in a simple manner by, in the data-packets switch, providing a first table associated with the first link, of which first table a left column comprises first header parts, and a second table associated with the second link, of which second table a left column comprises second header parts, with the same right column, which should then comprise third header parts. In this connection, the third data part should generally comprise either the first or the second data part, although exceptions to this are possible. In the event of applying the data-packets switch according to the invention as MSC, or Mobile Switching Center, in telecommunication systems, the time interval will be determined by the time required for carrying out a certain part of the handover procedure.

A first embodiment of the data-packets switch according to the invention is characterized in that the first header parts of the first data packets are each provided with an identification part comprising a first value, and the second header parts of the second data packets are each provided with an identification part comprising a second value, and the third header parts of the third data packets are each provided with an identification part comprising a third value.

According to said first embodiment, each header part comprises its own identification part, such as, e.g., a vpi/vci (virtual-path identifier/virtual-circuit identifier).

A second embodiment of the data-packets switch according to the invention is characterized in that the converting means are provided with means for, during at least the time interval, converting both the first value and the second value into the third value, which first value and second value are mutually equal.

In this connection, an additional provision should be provided in at least one of the entities, in order that both entities transmit the mutually equal first and second values to the data-packets switch, which simplifies the control of the data-packets switch as a result of no longer having to take into account two different first and second values, which should be converted into the same third value.

A third embodiment of the data-packets switch according to the invention is characterized in that the converting means are provided with further means for, during at least the time interval, converting both the first value and the second value into the third value, which first value and second value are mutually different.

In this connection, no additional provisions need be made in entities connected to the first and second links, such as, e.g., base stations, since the control of the data-packets switch has been informed of the need to convert the mutually different first and second values into the third value.

The invention still further relates to a method for, during a handover procedure, switching data packets by way of a data-packets switch which is capable of being coupled to a first base station by way of a first link, and which is capable of being coupled to a second base station by way of a second link, with a mobile terminal arranged for wireless communication before initiation of the handover procedure being wirelessly connected to the first base station, and after termination of the handover procedure being wirelessly connected to the second base station, which method comprises the steps of by way of the first link receiving first data packets and, in response thereto, by way of a third link transmitting third data packets, and by way of the second link receiving second data packets and, in response thereto, by way of the third link transmitting third data packets, which first data packets comprise a first header part and a first data part, and which second data packets comprise a second header part and a second data part, and which third data packets comprise a third header part and a third data part.

The method according to the invention is characterized in that the method comprises the step of during at least part of the handover procedure converting both the first header part and the second header part into the third header part, with the third data part comprising at least part of at least one of the first and second data parts.

A first embodiment of the method according to the invention is characterized in that the method comprises the step of during at least part of the handover procedure converting a fourth header part of fourth data packets arriving by way of a fourth link into both a fifth header part of fifth data packets to be transmitted by way of the first link and a sixth header part of sixth data packets to be transmitted by way of the second link.

A second embodiment of the method according to the invention is characterized in that the first header parts of the first data packets are each provided with an identification part comprising a first value, and the second header parts of the second data packets are each provided with an identification part comprising a second value, and the third header parts of the third data packets are each provided with an identification part comprising a third value.

A third embodiment of the method according to the invention is characterized in that the method comprises the step of during at least part of the handover procedure converting both the first value and the second value into the third value, which first value and second value are mutually equal.

A fourth embodiment of the method according to the invention is characterized in that the method comprises the step of during at least part of the handover procedure converting both the first value and the second value into the third value, which first value and second value are mutually different.

U.S. Pat. No. 5,381,409 and EP 0 450 708 describe an ATM switch having a high internal rate. The data-packets switch according to the invention is not disclosed there.

C. REFERENCES

[1] U.S. Pat. No. 5,381,409
[2] EP 0 450 708.

All references, including the references quoted in/with the references, are considered as being incorporated by reference herein in the present patent application.

D. EXEMPLARY EMBODIMENT

The invention will be explained in greater detail by reference to an exemplary embodiment shown in the Figures. Here:

FIG. 1 shows a telecommunication system according to the invention, comprising a data-packets switch according to the invention.

The telecommunication system according to the invention shown in FIG. 1 comprises a mobile terminal 1 situated in a vehicle which is either wirelessly connected to a first base station 3 by way of a radio link 2, or is wirelessly connected to a second base station 6 by way of a radio link 5. By way of a first link 4, the first base station 3 feeds first data packets to an input/output of a first forked switch 11 of a data-packets switch 10 according to the invention, and by way of a second link 7 the second base station 6 feeds second data packets to an input/output of a second forked switch 12 of data-packets switch 10. A third link 8 is coupled to a third forked switch 13 of data-packets switch 10, and a fourth link 9 is coupled to a fourth forked switch 14 of data-packets switch 10.

In data-packets switch 10, an output of first forked switch 11 is connected to an input of a buffer 21, of which an output is connected to an input of a shift register 23. An output of shift register 23 is connected to a first input of a switch unit 33. First inputs/outputs of shift register 23 are connected to one side of a comparator 25, and second inputs/outputs of shift register 23 are coupled to one side of a comparator 27, of which another side is coupled to a buffer memory 29 which is connected to a table memory 32.

In data-packets switch 10, an output of second forked switch 12 is connected to an input of a buffer 22, of which an output is connected to an input of a shift register 24. An output of shift register 24 is connected to a second input of switch unit 33. First inputs/outputs of shift register 24 are connected to one side of a comparator 26, and second inputs/outputs of shift register 24 are coupled to one side of a comparator 28, of which another side is coupled to a buffer memory 30 which is connected to table memory 32.

Other sides of comparator 25 and comparator 26 are mutually coupled, and are connected to a table memory 31. A third input of switch unit 33 is coupled to a data-packet generator 34. A first output of switch unit 33 is connected to an input of third forked switch 13, a second output of switch unit 33 is connected to an input of fourth forked switch 14, and a third output of switch unit 33 is connected to a data-packet receiver 35.

In data-packets switch 10, an output of third forked switch 13 is connected to an input of a buffer 41, of which an output is connected to an input of a shift register 43. An output of shift register 43 is connected to a first input of a switch unit 53. First inputs/outputs of shift register 43 are coupled to one side of a comparator 45, and second inputs/outputs of shift register 43 are coupled to one side of a comparator 47, of which another side is coupled to a buffer memory 49 which is connected to a table memory 52.

In data-packets switch 10, an output of fourth forked switch 14 is connected to an input of a buffer 42, of which an output is connected to an input of a shift register 44. An output of shift register 44 is connected to a second input of switch unit 53. First inputs/outputs of shift register 44 are coupled to one side of a comparator 46, and second inputs/outputs of shift register 44 are coupled to one side of a comparator 48, of which another side is coupled to a buffer memory 50 which is connected to table memory 52.

Other sides of comparator 45 and comparator 46 are mutually coupled, and are connected to a table memory 51. A third input of switch unit 53 is coupled to a data-packet generator 54. A first output of switch unit 53 is connected to an input of first forked switch 11, a second output of switch unit 53 is connected to an input of second forked switch 12, and a third output of switch unit 53 is connected to a data-packet receiver 55.

Furthermore, in data-packets switch 10 there is situated a processor 100 which is connected to the shift registers 23,24,43,44 and to the comparators 25,26,27,28,45,46,47,48 and to the buffer memories 29,30,49,50 and to the table memories 31,32,51,52 and to the switch units 33,53 and to the data-packet generators 34,54 and to the data-packet receivers 35,55 for obtaining information by way of means 23–35,43–55 and for providing instructions to means 23–35, 43–55. Apart from the function of being able to compare the signals situated on the one side and on the other side, the comparators 25,26,27,28,45,46,47,48 each dispose of the option of being able to interconnect the one side with the other side under control of processor 100 for being able to pass on signals situated on the one side to the other side and vice versa. This option may be realized in a manner known to those skilled in the art by adding switches situated between the one side and the other side.

The operation of the telecommunication system shown in FIG. 1 before initiation of a handover procedure is as follows. As long as mobile terminal 1 is situated in the first coverage area of first base station 3 during communication, mobile terminal 1 transmits analog and/or digital information by way of radio link 2 to first base station 3, which converts this information into first data packets which are transmitted to first forked switch 11 of data-packets switch 10 by way of first link 4. By way of first forked switch 11, the first data packets arrive in buffer 21, which feeds this first data packets to shift register 23 one by one. As soon as one entire first data packet is situated in shift register 23, processor 100 is informed accordingly, whereafter processor 100 instructs table memory 32 to generate headers or parts thereof stored in a left column, and to consecutively feed them to buffer memory 29. Per header or part thereof, comparator 27 carries out a comparison with the header part of the data packet present in shift register 23 and, in the event of equality, processor 100 is informed accordingly by comparator 27. Since it is now known from which base station the data packet directly originates and from which mobile terminal the data packet indirectly originates, processor 100 instructs table memory 32 to generate the associated new header or part thereof stored in a right column and to feed it to buffer memory 29. Processor 100 then instructs comparator 27 to assume a state of interconnection whereafter, under control of processor 100, the new header or part thereof takes the place of the old header part in shift register 23. As a result, the first data packet present in shift register 23 is converted into a third data packet, which enters by way of the first input of switch unit 33 and is added, under control of processor 100, to third forked switch 13 by way of the first output of switch unit 33, whereafter the third data packet is transmitted by way of third link 8.

Arriving by way of third link 8, fourth data packets intended for mobile terminal 1 pass third forked switch 13 and arrive in buffer 41, which feeds the fourth data packets to shift register 43 one by one. As soon as one entire fourth data packet is situated in shift register 43, processor 100 is informed accordingly, whereafter processor 100 instructs table memory 52 to generate headers or parts thereof stored in a left column, and to consecutively feed them to buffer memory 49. Per header or part thereof, comparator 47 carries out a comparison with the header part of the data packet present in shift register 43 and, in the event of equality, processor 100 is informed accordingly by comparator 47. Since it is now known for which mobile terminal the data packet is intended, processor 100 instructs table memory 52 to generate the associated new header or part thereof stored in a right column, and to feed it to buffer memory 49. The new header or part thereof then indicates that the data packet should be transmitted to the first base station 3. Processor 100 then instructs comparator 47 to assume a state of interconnection whereafter, under control of processor 100, the new header or part thereof takes the place of the old header part in shift register 43. As a result, the fourth data packet present in shift register 43 is converted into a fifth data packet, which enters by way of the first input of switch unit 53 and is added, under control of processor 100, to first forked switch 11 by way of the first output of switch unit 53, whereafter the fifth data packet is transmitted by way of first link 4.

The operation of the telecommunication system shown in FIG. 1 after termination of the handover procedure is as follows. Mobile terminal 1 is situated in the second coverage area of second base station 6 during communication and transmits analog and/or digital information by way of radio link 5 to second base station 6, which converts this information into second data packets which are transmitted to second forked switch 12 of data-packets switch 10 by way of second link 7. By way of second forked switch 12, the second data packets arrive in buffer 22, which feeds the second data packets to shift register 24 one by one. As soon as one entire second data packet is situated in shift register 24, processor 100 is informed accordingly, whereafter processor 100 instructs table memory 32 to generate headers or parts thereof stored in a left column, and to consecutively feed them to buffer memory 30. Per header or part thereof, comparator 28 carries out a comparison with the header part of the data packet present in shift register 24 and, in the event of equality, processor 100 is informed accordingly by comparator 28. Since it is now known from which base station the data packet directly originates and from which mobile terminal the data packet indirectly originates, processor 100 instructs table memory 32 to generate the associated new header or part thereof stored in a right column, and to feed it to buffer memory 30. Processor 100 then instructs comparator 28 to assume a state of interconnection whereafter, under control of processor 100, the new header or part thereof takes the place of the old header part in shift register 24. As a result, the second data packet present in shift register 24 is converted into a third data packet, which enters by way of the second input of switch unit 33 and is added, under control of processor 100, to third forked switch 13 by way of the first output of switch unit 33, whereafter the third data packet is transmitted by way of third link 8.

Arriving by way of third link 8, fourth data packets intended for mobile terminal 1 bass third forked switch 13 and arrive in buffer 41, which feeds the fourth data packets to shift register 43 one by one. As soon as one entire fourth data packet is situated in shift register 43, processor 100 is informed accordingly, whereafter processor 100 instructs table memory 52 to generate headers or parts thereof stored in a left column, and to consecutively feed them to buffer memory 49. Per header or part thereof, comparator 47 carries out a comparison with the header part of the data packet present in shift register 43 and, in the event of equality, processor 100 is informed accordingly by comparator 47. Since it is now known for which mobile terminal the data packet is intended, processor 100 instructs table memory 52 to generate the associated new header or part thereof stored in a right column, and to feed it to buffer memory 49. The new header or part thereof then indicates that the data packet should be transmitted to the second base station 6. Processor 100 then instructs comparator 47 to assume a state of interconnection whereafter, under control of processor 100, the new header or part thereof takes the place of the old header part in shift register 43. As a result, the fourth data packet present in shift register 43 is converted into a fifth data packet, which enters by way of the first input of switch unit 53 and is added, under control of processor 100, to second forked switch 12 by way of the second output of switch unit 53, whereafter the fifth data packet is transmitted by way of second link 7.

As compared to the operation described above of the telecommunication system shown in FIG. 1 before initiation and after termination of the handover procedure, the operation during the handover of the telecommunication system according to the invention shown in FIG. 1 differs, namely, as follows. Since mobile terminal 1 is now situated, during communication, in an overlapping part of the first coverage area of first base station 3 and the second coverage area of second base station 6, mobile terminal 1 at first continues transmitting the analog and/or digital information by way of radio link 2 to first base station 3, which converts this information into first data packets, which are transmitted to first forked switch 11 of data-packets switch 10 by way of first link 4 whereafter, in the manner already described, the first data packets are converted by data-packets switch 10 into third data packets, which are transmitted by way of third link 8. As a result of being situated in the overlapping part, however, mobile terminal 1 receives a code message from second base station 6, on the basis whereof mobile terminal 1 decides that radio link 5 with second base station 6 in all probability offers a better radio quality than radio link 2 with first base station 3. In response thereto, mobile terminal 1 transmits analog and/or digital code information by way of radio link 2 to first base station 3, which converts this code information into a signalling data packet which is transmitted to first forked switch 11 of data-packets switch 10 by way of first link 4. By way of first forked switch 11, the signalling data packet arrives in buffer 21, which feeds the signalling data packet to shift register 23. As soon as the packet is entirely situated in shift register 23, processor 100 is informed accordingly, whereafter processor 100 instructs table memory 32 to generate headers or parts thereof stored in a left column and to consecutively feed them to buffer memory 29. Per header or part thereof, comparator 27 carries out a comparison with the header part of the signalling data packet present in shift register 23 and, in the event of equality, processor 100 is informed accordingly by comparator 27. Since it is now known to processor 100 that it involves a signalling data packet, the contents should then be analized. This may be done in at least two different manners.

Firstly, processor 100 might instruct shift register 23 to feed the signalling data packet to switch unit 33. Subsequently, the signalling data packet enters by way of the first input of switch unit 33 and then, under control of processor 100, leaves switch unit 33 by way of the second output of switch unit 33, whereafter it is stored and analized by data-packet receiver 35. The latter informs processor 100 that the contents of the signalling data packet indicate that mobile terminal 1, together with old first base station 3 and new second base station 6, is in a handover procedure.

Secondly, processor 100 might instruct table memory 31 to generate data parts stored in a left column, and to consecutively feed them to comparator 25, which then per data part carries out a comparison with the data part of the signalling data packet present in shift register 23 and, in the event of equality, processor 100 is informed accordingly by comparator 25. As a result, it is now known to processor 100 that the contents of the signalling data packet indicate that mobile terminal 1, together with old first base station 3 and new second base station 6, is in a handover procedure.

Thus, processor 100 is informed of mobile terminal 1, together with old first base station 3 and new second base station 6, being in a handover procedure. Data-packets switch 10 should then, during (at least part of) the handover procedure convert both first data packets arriving by way of first link 4, and second data packets arriving by way of second link 7, into third data packets to be transmitted by way of third link 8. This may once again be done in at least two manners.

Firstly, first data packets arriving by way of first link 4 and first forked switch 11 and buffer 21 might be converted into third data packets by way of shift register 23 and table memory 32 and buffer memory 29 and comparator 27, and second data packets arriving by way of second link 7 and second forked switch 12 and buffer 22 might be converted into third data packets by way of shift register 24 and table memory 32 and buffer memory 30 and comparator 28, with all third data packets obtained in this manner being fed to third link 8 by way of the first and second inputs of switch unit 33 and by way of the first output of switch unit 33 and third forked switch 13. Since each header part of each data packet has its own identification part such as, e.g., a vpi/vci (virtual-path identifier/virtual-circuit identifier), there may arise two situations. According to a first situation, first header parts of first data packets each have a first identification part comprising a first value, and second header parts of second data packets each have a second identification part comprising a second value, which first and second values are mutually different. In this case, two rows in the left column of table memory 32 will have a different (first or second) value, while both rows should have the same (third) value in the right column. According to a second situation, the first and second values are mutually equal as a result of a certain communication having taken place between first base station 3 and second base station 6. In this case, table memory 32 will either dispose of two mutually equal rows (one row for the purpose of buffer memory 29, and one row equal thereto for the purpose of memory buffer 30), or table memory 32 should be capable of consecutively feeding information stored in one row both to buffer memory 29 and to buffer memory 30.

Secondly, first data packets arriving by way of first link 4 and first forked switch 11 and buffer 21 might be converted into third data packets by way of shift register 23 and table memory 32 and buffer memory 29 and comparator 27, while the data part of second data packets arriving by way of second link 7 and second forked switch 12 and buffer 22 originating from shift register 24 is placed, by way of comparator 26 and comparator 25 (which should then be in a state of interconnection), in shift register 23, which at that moment should of course be empty, and with the header part of second data packets arriving by way of second link 7 and second forked switch 12 and buffer 22 originating from shift register 24 being investigated by way of comparator 28 and buffer memory 30 and table memory 32, whereafter the new header part is placed, by way of buffer memory 29 and the comparator 27 being in a state of interconnection, in shift register 23, which then comprises a third data packet. All third data packets obtained in this manner are then fed to third link 8 by way of the first input of switch unit 33 and by way of the first output of switch unit 33 and third forked switch 13. Since each header part of each data packet has its own identification part such as, e.g., a vpi/vci (virtual-path identifier/virtual-circuit identifier), there may once again arise the two situations referred to above.

While processor 100 has been informed on the mobile terminal 1, together with old first base station 3 and second base station 6, being in a handover procedure, during (at least part of) the handover procedure fourth data packets intended for mobile terminal 1 arriving by way of third link 8 pass third forked switch 13 and arrive in buffer 41, which feeds the fourth data packets to shift register 43 one by one. As soon as one entire fourth data packet is situated in shift register 43, processor 100 is informed accordingly, whereafter processor 100 instructs table memory 52 to generate headers or parts thereof stored in a left column, and to consecutively feed them to buffer memory 49. Per header or part thereof, comparator 47 carries out a comparison with the header part of the data packet present in shift register 43 and, in the event of equality, processor 100 is informed accordingly by comparator 47. Since it is now known for which mobile terminal the data packet is intended, while it is also known that the mobile terminal is in a handover procedure with old first base station 3 and new base station 6, processor 100 instructs table memory 52 both to generate a fifth header part situated on the same row as the fourth header part but placed in a middle column, and to generate a sixth header part situated on the same row as the fourth header part but placed in a right column. The fifth header part is then placed, by way of buffer memory 49 and the comparator 47 being in a state of interconnection, in shift register 43, and the sixth header part is then placed, by way of buffer memory 50 and the comparator 48 being in a state of interconnection, in shift register 44, which at that moment should of course be empty. Furthermore, processor 100 instructs comparators 45 and 46 to place themselves in a state of interconnection, whereafter the data part of the fourth data packet is transcopied into shift register 44 by way of both comparators 45 and 46. As a result, in shift register 43 there is now situated the fifth data packet, which is fed to first base station 3 by way of switch unit 53 and first forked switch 11 and first link 4, and in shift register 44 there is now situated the sixth data packet, which is fed to second base station 6 by way of switch unit 53 and second forked switch 12 and second link 7.

Here, too, alternative methods are of course conceivable for converting the fourth data packet into the fifth and the sixth data packet. Thus, copying might be realized, e.g., without making use of shift register 44. In this case, a copy of the data part of the fourth data packet is temporarily stored in table memory 51, while the fifth header part is placed in shift register 43. The fifth data packet obtained in this manner should then be transmitted to first base station 3 by way of switch unit 53, whereafter the copy of the data part temporarily stored in table memory 51 is placed in the now empty shift register 43, while the sixth header part should also be placed in shift register 43. The sixth data packet composed in this manner may then be transmitted from shift register 43 to second base station 6 by way of switch unit 53. In this case, therefore, no use is made of shift register 44. Furthermore, the use of three columns in table memory 52 is superfluous, if on one row the fourth header part is situated in a left column and the fifth header part is situated in a right column, while on another row the fourth header part is situated in a left column and the sixth header part is situated in a right column. In this case, e.g., processor 100 should remember (e.g., by way of the copy of the data part temporarily stored in table memory 51) that, after conversion of the fourth data packet into the fifth data packet and transmission of the fifth data packet, a sixth data packet should still be composed. Furthermore, the use of three columns is superfluous, e.g., if the fifth header part and the sixth header part match completely, in which case the fifth data packet and the sixth data packet will therefore also match. Processor 100 should then control switch unit 53 in such a way that the fifth and sixth data packets, respectively, will still arrive at the first and second base stations 3 and 6, respectively.

Informing processor 100 of the handover procedure by way of a signalling data packet originating from first base station 3 is but one of the many options. Thus, the signalling data packet might also originate from second base station 6, or from another (higher) entity, such as an exchange, and processor 100 might further, in another way than by way of a signalling data packet, be informed on the handover procedure by way of a route not shown in FIG. 1.

In the event, e.g., that processor 100 is informed of the handover procedure by way of a signalling data packet originating from another (higher) entity such as, e.g., an exchange, processor 100 might instruct data-packet generator 54 to generate a further signalling data packet which is transmitted to first base station 3 by way of the third input of switch unit 53 and, e.g., by way of the first output of switch unit 53 and first forked switch 11 and first link 4. By way of data-packet generator 34, processor 100, after having been informed of the handover procedure, may generate a next signalling data packet which is then transmitted to another (higher) entity such as, e.g., an exchange, by way of the third input of switch unit 33 and, e.g., by way of the second output of switch unit 33 and fourth forked switch 14 and fourth link 9.

Processor 100 will preferably also exercise control over the buffers 21,22,41,42 in order to be capable of monitoring the complete filling up, and to be capable of preventing that the capacity of shift registers, 23,24,43,44 is called upon in an ineffective wanner.

In the telecommunication system according to the invention, data-packets switch 10 according to the invention therefore has converting means for, during at least part of the handover procedure, converting both the first header part (of a first data packet arriving by way of first link 4) and the second header part (of a second data packet arriving by way of second link 7) into the third header part (of a third data packet to be transmitted by way of third link 8), with the third data part (of the third data packet to be transmitted by way of third link 8) comprising at least part of at least one of the first and second data parts (of the first and second data packets arriving by way of first link 4 and second link 7). In the exemplary embodiment shown in FIG. 1, the converting means are formed by shift registers 23,24 and comparators 25,26,27,28 and buffer memories 29,30 and table memories 31,32 in co-operation with processor 100 and switch unit 33. Of course, alternative embodiments are conceivable.

In the telecommunication system according to the invention, data-packets switch 10 according to the invention preferably has further converting means for, during at least part of the handover procedure, converting a fourth header part of fourth data packets arriving by way of third link 8 into both a fifth header part of fifth data packets to be transmitted by way of first link 4 and a sixth header part of sixth data packets to be transmitted by way of second link 7. In the exemplary embodiment shown in FIG. 1, said further converting means are formed by shift registers 43,44 and comparators 45,46,47,48 and buffer memories 49,50 and table memories 51,52 in cooperation with processor 100 and switch unit 53. Of course, once again alternative embodiments are conceivable.

I claim:

1. A telecommunication system comprising at least first and second base stations for wireless communication with a mobile terminal which, before initiation of a handover procedure, is wirelessly connected to the first base station and which, after termination of the handover procedure, is wirelessly connected to the second base station, wherein the first base station is capable of being coupled to a data-packets switch by way of a first link and the second base station is capable of being coupled to the data-packets switch by way of a second link, with first data packets arriving by way of the first link comprising a first header part and a first data part, and second data packets arriving by way of the second link comprising a second header part and a second data part, and third data packets to be transmitted by way of a third link comprising a third header part and a third data part, the third link is capable of being connected to the data-packets switch, wherein the data-packets switch, before the handover procedure, provides a first virtual connection between the first and third links and, after the handover procedure, provides a second virtual connection between the second and third links, wherein the data-packets switch comprises a converter which, during at least part of the handover procedure, permits both the first and second virtual connections to simultaneously occur and converts both the first header part and the second header part of ones of the first and second data packets, respectively, that occur during said part of the handover procedure, into the third header part, with the third data part comprising at least part of at least one of the first and second data parts, such that during said part of the handover procedure, said ones of both the first and second data packets are routed to the third link.

2. The telecommunication system according to claim 1, wherein the data-packets switch comprises a further converter which, during at least part of the handover procedure, converts a fourth header part of fourth data packets arriving by way of a fourth link into both a fifth header part of fifth data packets to be transmitted by way of the first link and a sixth header part of sixth data packets to be transmitted by way of the second link.

3. The telecommunication system according to claim 1, wherein the first header parts of the first data packets each have an identification part comprising a first value, and the second header parts of the second data packets each have an identification part comprising a second value, and the third header parts of the third data packets each have an identification part comprising a third value.

4. The telecommunication system according to claim 3, wherein the converter comprises a further converter which, during at least part of the handover procedure, converts both the first value and the second value into the third value, wherein the first value and the second value are mutually equal.

5. The telecommunication system according to claim 3, wherein the converter comprises a further converter which, during at least part of the handover procedure, converts both the first value and the second value into the third value, wherein the first value and the second value are mutually different.

6. A data-packets switch for:

receiving, via a first link, first data packets and, in response thereto, transmitting, via a third link, third data packets, the first data packets having a first header part and a first data part, and the third data packets having a third header part and a third data part; and receiving, via a second link, second data packets and, in response thereto, transmitting, via a fourth link, fourth data packets, the second data packets having a second header part and a second data part, and the fourth data packets having a fourth header part and a fourth data part; and wherein the data-packets switch comprises a converter which:

before a handover procedure, provides a first virtual connection between the first and third links and, after the handover procedure, provides a second virtual connection between the second and fourth links; and during a time interval occurring during the handover procedure, permits both the first and second virtual connections to simultaneously occur and converts both the first header part and the second header part of ones of the first and second data packets, respectively, that occur during said interval, into the third header part, with the third data part comprising at least part of at least one of the first and second data parts, such that during said interval, said ones of both the first and second data packets are routed to the third link.

7. The data-packets switch according to claim 6, wherein the first header parts of the first data packets each have an identification part comprising a first value, and the second header parts of the second data packets each have an identification part comprising a second value, and the third header parts of the third data packets each have an identification part comprising a third value.

8. The data-packets switch according to claim 7, wherein the converter comprises a further converter which during the time interval, converts both the first value and the second value into the third value, wherein the first value and the second value are mutually equal.

9. The data-packets switch according to claim 7, wherein the converter comprises a further converter which, during the time interval, converts both the first value and the second value into the third value, wherein the first value and the second value are mutually different.

10. A method for, during a handover procedure, switching data packets by way of a data-packets switch, which is capable of being coupled to a first base station, by way of a first link, and to a second base station, by way of a second link, with a mobile terminal arranged for wireless communication, the terminal being wirelessly connected, before initiation of the handover procedure, to the first base station and, after termination of the handover procedure, to the second base station, the method comprising the steps of:

receiving, via a first link, first data packets and, in response thereto, transmitting, via a third link, corresponding ones of third data packets;

receiving, via a second link, second data packets and, in response thereto, transmitting, via the third link, corresponding ones of the third data packets, the first data packets having a first header part and a first data part, the second data packets having a second header part and a second data part, and the third data packets having a third header part and a third data part; and during at least part of the handover procedure:

permitting both the first and second virtual connections to simultaneously occur; and converting both the first header part and the second header part of ones of the first and second data packets, respectively, that occur during said part of the handover procedure, into the third header part, with the third data part comprising at least part of at least one of the first and second data parts, such that during said part of the handover procedure, said ones of both the first and second data packets are routed to the third link.

11. The method according to claim 10 further comprising the step of:

converting, during said part of the handover procedure, a fourth header part of fourth data packets arriving by way of a fourth link into both a fifth header part of fifth data packets to be transmitted by way of the first link and a sixth header part of sixth data packets to be transmitted by way of the second link.

12. The method according to claim 10 wherein the first header parts of the first data packets each have an identification part comprising a first value, and the second header parts of the second data packets each have an identification part comprising a second value, and the third header parts of the third data packets each have an identification part comprising a third value.

13. The method according to claim 12 further comprising the step of:

converting, during said part of the handover procedure, both the first value and the second value into the third value, wherein the first value and the second value are mutually equal.

14. The method according to claim 12 further comprising the step of:

converting, during said part of the handover procedure, both the first value and the second value into the third value, wherein the first value and the second value are mutually different.

* * * * *